United States Patent
Hong

(10) Patent No.: US 12,096,518 B2
(45) Date of Patent: Sep. 17, 2024

(54) DATA TRANSMISSION METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 314 days.

(21) Appl. No.: 17/629,567

(22) PCT Filed: Jul. 26, 2019

(86) PCT No.: PCT/CN2019/097991
§ 371 (c)(1),
(2) Date: Jan. 24, 2022

(87) PCT Pub. No.: WO2021/016755
PCT Pub. Date: Feb. 4, 2021

(65) Prior Publication Data
US 2022/0272522 A1    Aug. 25, 2022

(51) Int. Cl.
*H04W 8/20* (2009.01)
*H04W 8/18* (2009.01)
*H04W 60/04* (2009.01)
*H04W 68/00* (2009.01)
*H04W 76/20* (2018.01)

(52) U.S. Cl.
CPC ........... *H04W 8/20* (2013.01); *H04W 8/183* (2013.01); *H04W 60/04* (2013.01); *H04W 68/005* (2013.01); *H04W 76/20* (2018.02)

(58) Field of Classification Search
CPC ....... H04W 8/20; H04W 76/20; H04W 8/183; H04W 60/04; H04W 68/005
USPC .......................................................... 370/329
See application file for complete search history.

(56) References Cited

U.S. PATENT DOCUMENTS

| | | | |
|---|---|---|---|
| 2014/0044099 A1 | 2/2014 | Sfar | |
| 2017/0094628 A1 | 3/2017 | Miao et al. | |
| 2017/0150545 A1* | 5/2017 | Ramkumar | H04W 8/082 |
| 2017/0325278 A1* | 11/2017 | Ramkumar | H04W 8/082 |
| 2020/0037380 A1* | 1/2020 | Qiu | H04W 68/12 |

(Continued)

FOREIGN PATENT DOCUMENTS

| | | |
|---|---|---|
| CN | 101217747 A | 7/2008 |
| CN | 101553055 A | 10/2009 |
| CN | 103747513 A | 4/2014 |

(Continued)

OTHER PUBLICATIONS

3GPP; TSGSSA; "Procedures for the 5G System"; Stage2 (Release 15); << 3GPP TS 23.502 V15.5.1>>; Apr. 1, 2019; pp. 42 to 48, section 4.2.3.3.

(Continued)

*Primary Examiner* — Mark G. Pannell
(74) *Attorney, Agent, or Firm* — Volpe Koenig

(57) ABSTRACT

A data transmission method including: when target data is required to be sent to a first SIM card on a terminal which supports a plurality of subscriber identity module (SIM) cards, determining whether there is a second SIM card on the terminal; and when there is a second SIM card, sending target indication information to a base station which the second SIM card accesses.

16 Claims, 16 Drawing Sheets

(56) References Cited

U.S. PATENT DOCUMENTS

2020/0396591 A1* 12/2020 Ou ........................ H04W 24/08
2021/0352618 A1* 11/2021 Yang ....................... H04W 8/20

FOREIGN PATENT DOCUMENTS

| CN | 105072706 A | 11/2015 |
| CN | 106028368 A | 10/2016 |
| CN | 106793089 A | 5/2017 |
| CN | 107509240 A | 12/2017 |
| CN | 109151807 A | 1/2019 |
| EP | 2512184 A1 | 10/2012 |
| WO | 2015180138 A1 | 12/2015 |

OTHER PUBLICATIONS

ETRI "TS 23.502: adding buffered DL data forwarding to UE triggered Service"; << SA WG2 Meeting #122: S2-174421>>; pp. 1 to 7.

* cited by examiner

DATA TRANSMISSION METHOD AND APPARATUS

CROSS REFERENCE TO RELATED APPLICATION

The present application is a U.S. National Phase of International Patent Application Serial No. PCT/CN2019/097991 filed on Jul. 26, 2019. The entire contents of the above-cited application are hereby incorporated by reference in their entirety for all purposes.

BACKGROUND

Currently, there are more and more terminals which support a plurality of SIM (Subscriber Identification Module) cards. Typical application scenarios are as follows:

a business subscriber has a private SIM card and a SIM card for business, which are placed in the same terminal. Or an ordinary subscriber has a plurality of private SIM cards, and he can choose which SIM card to use according to service.

A plurality of SIM cards supported by the same terminal may come from the same operator or from different operators.

SUMMARY

In order to solve problems in the related art, examples of the disclosure described herein provide a data transmission method and apparatus.

According to a first aspect of the examples of the disclosure, provided and described herein is a data transmission method. The method is applicable to a core network, and includes:

determining, when target data is required to be sent to a first SIM (Subscriber Identification Module) card on a terminal which supports a plurality of SIM cards, whether there is a second SIM card on the terminal; and sending, when there is the second SIM card, target indication information to a base station accessed by the second SIM card.

According to a second aspect of the examples of the disclosure, provided and described herein is a data transmission method. The method is applicable to a base station accessed by a second SIM (Subscriber Identification Module) card on a terminal which supports a plurality of SIM cards, and includes:

receiving target data and target indication information sent by a core network, wherein the target indication information comprises a first indication information, or comprises a first indication information and a second indication information, the first indication information is used to inform the base station that the target data is data that is required to be sent to a first SIM card, and the second indication information is used to inform the base station that the first SIM card and the second SIM card belong to the same terminal; and sending the target data to the first SIM card after establishing an RRC (Radio Resource Control) connection with the first SIM card based on the first indication information; or sending the target data to the second SIM card based on the first indication information and the second indication information.

According to a third aspect of the examples of the disclosure, provided and described herein is a data transmission method. The method is applicable to a base station accessed by a second SIM (Subscriber Identification Module) card on a terminal which supports a plurality of SIM cards, and includes:

receiving target indication information sent by a core network, wherein the target indication information comprises a third indication information, or comprises a second indication information and the third indication information, the second indication information is used to inform the base station that a first SIM card and the second SIM card belong to the same terminal, and the third indication information is used to inform the base station that the core network has target data that is required to be sent to a first SIM card of the terminal;

sending a data request message for requesting the target data to the core network based on the third indication information;

receiving the target data sent by the core network based on the data request message; and sending the target data to the first SIM card after establishing an RRC (Radio Resource Control) connection with the first SIM card; or sending the target data to the second SIM card based on the second indication information and the third indication information.

According to a fourth aspect of the examples of the disclosure, provided is a non-transitory computer-readable storage medium. The storage medium stores a computer program, and the computer program is configured to execute the data transmission method described in the above first aspect.

According to a fifth aspect of the examples of the disclosure, provided is a non-transitory computer-readable storage medium. The storage medium stores a computer program, and the computer program configures a processor to execute the data transmission method described in the above second aspect.

According to a sixth aspect of the examples of the disclosure, provided is a non-transitory computer-readable storage medium. The storage medium stores a computer program, and the computer program configures a processor to execute the data transmission method described in the above third aspect.

According to a seventh aspect of the examples of the disclosure, provided is a data transmission apparatus. The apparatus is integrated in a core network, and includes:

a processor; and a memory for storing processor executable instructions.

The processor is configured to execute the instructions to carry out the data transmission method described in the above first aspect.

According to an eighth aspect of the examples of the disclosure, provided and described herein is a data transmission apparatus. The apparatus is integrated in a base station accessed by a second SIM (Subscriber Identification Module) card on a terminal which supports a plurality of SIM cards, and includes:

a processor; and a memory for storing processor executable instructions.

The processor is configured to execute the instructions to carry out the data transmission method described in the above second aspect.

According to a ninth aspect of the examples of the disclosure, provided and described herein is a data transmission apparatus. The apparatus is integrated in a base station accessed by a second SIM (Subscriber Identification Module) card on a terminal which supports a plurality of SIM cards, including:

a processor; and a memory for storing processor executable instructions.

The processor is configured to execute the instructions to carry out the data transmission method described in the above third aspect.

It should be understood that the above general description and the following detailed description are only examples and explanatory and cannot limit the disclosure.

BRIEF DESCRIPTION OF THE DRAWINGS

The accompanying drawings are incorporated into the specification and constitute a part of the specification, to show the examples within the scope of the disclosure, and are used to explain the principle of the disclosure together with the specification.

DETAILED DESCRIPTION

Figure 1:
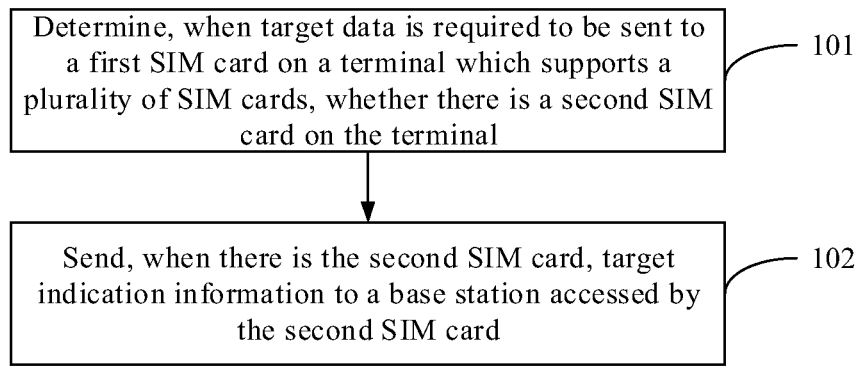
FIG. 1 is a flow chart of a data transmission method shown according to an example.

The examples will be described in detail here, and are shown in the drawings. When the following description refers to the drawings, unless otherwise indicated, the same numerals in different drawings indicate the same or similar elements. The implementations described in the following examples do not represent all implementations within the scope of the disclosure. On the contrary, they are merely examples of apparatuses and methods within the scope of the disclosure as defined in detail in the appended claims.

The terms used in the disclosure are only for the purpose of describing specific examples, and are not intended to limit the disclosure. The singular forms "a", "said" and "the" used in the disclosure and the appended claims are also intended to include plural forms, unless the context clearly indicates otherwise. It should also be understood that the term "and/or" as used herein refers to and includes any or all possible combinations of one or more associated listed items.

It should be understood that although the terms first, second, third, etc., may be used in the disclosure to describe various information, the information should not be limited to these terms. These terms are only used to distinguish the same type of information from each other. For example, without departing from the scope of the disclosure, first information may also be referred to as second information, and similarly, second information may also be referred to as first information. Depending on the context, the word "if" as used herein can be interpreted as "when" or "while" or "in response to determining".

For a SIM card in an IDLE state, when there is data to be sent to the SIM card, the core network will first page all base stations in the TA (Tracking Area) where the SIM card is located, then these base stations send paging signaling to the SIM card, and the SIM card that receives the paging signaling sent by the base stations establishes an RRC (Radio Resource Control) connection with the base stations to receive the data. However, this approach has drawbacks in that it may not meet requirements for data transmission especially if there is a requirement for low delay.

Examples of the disclosure provide a data transmission method. When target data is required to be sent to a first SIM (Subscriber Identification Module) card on a terminal which supports a plurality of SIM cards, a core network may first determine whether there is a second SIM card on the terminal. When there is the second SIM card, target indication information may be sent to a base station accessed by the second SIM card. The target indication information may be first indication information used to inform the base station that the target data is data that is required to be sent to the first SIM card. The core network sends the target data to the base station while sending the first indication information. After receiving the target data and the first indication information, the base station may establish an RRC connection with the first SIM card and then send the target data to the first SIM card.

In some embodiments, in addition to sending the target data and the first indication information to the base station accessed by the second SIM card, the core network may also send second indication information to the base station. The second indication information is used to inform the base station that the first SIM card and the second SIM card belong to the same terminal. After receiving the second indication information, the base station may still establish the RRC connection with the first SIM card and directly send the target data to the first SIM card. Alternatively, the base station may send the target data to the second SIM card that has established the connection with the base station based on the first indication information and the second indication information, and the second SIM card forwards the target data to the first SIM card.

In the examples of the disclosure, the target indication information sent by the core network may be third indication information used to inform the base station that the core network has the target data that is required to be sent to the first SIM card. The base station decides whether the target data is received based on the third indication information.

If the target data may be received, the base station sends a data request message to the core network, the core network sends the target data to the base station based on the data request message, and the base station sends the target data to the first SIM card after establishing an RRC connection with the first SIM card.

In some embodiments, in the examples of the disclosure, in addition to sending the third indication information to the base station, the core network may also send the second indication information to the base station. After receiving the second indication information and the third indication information, the base station may still establish the RRC connection with the first SIM card and directly send the target data to the first SIM card. Alternatively, based on the second indication information and the third indication information, the base station does not need to establish an RRC connection with the first SIM card, but sends the target data to the second SIM card, and the second SIM card forwards the target data to the first SIM card.

In the above examples, when the target data is required to be sent to the first SIM card on the terminal, the core network can send the target data to the first SIM card without paging all base stations in a TA of the first SIM card, such that the delay of data transmission is reduced and the efficiency of data transmission is improved.

First, the above data transmission method will be described below from a core network side.

Examples of the disclosure provide a data transmission method which can be integrated in a core network. Referring to FIG. 1, FIG. 1 is a flow chart of a data transmission method according to an example. The method may include the following steps:

In step 101, when target data is required to be sent to a first SIM (Subscriber Identification Module) card on a terminal which supports a plurality of SIM cards, whether there is a second SIM card on the terminal is determined.

In step 102, when there is the second SIM card, target indication information is sent to a base station accessed by the second SIM card.

In the above example, when the target data is required to be sent to the first SIM card on the terminal, the core network may determine whether there is the second SIM card on the terminal. When there is the second SIM card, the target indication information may be sent to the base station accessed by the second SIM card, and the base station sends the target data to the first SIM card according to the target indication information, so that the core network may, without needing to page all the base stations in the TA of the first SIM card, send the target data to the first SIM card only through the base station accessed by the second SIM card, the delay of data transmission is reduced and the efficiency of data transmission is improved.

Figure 2:
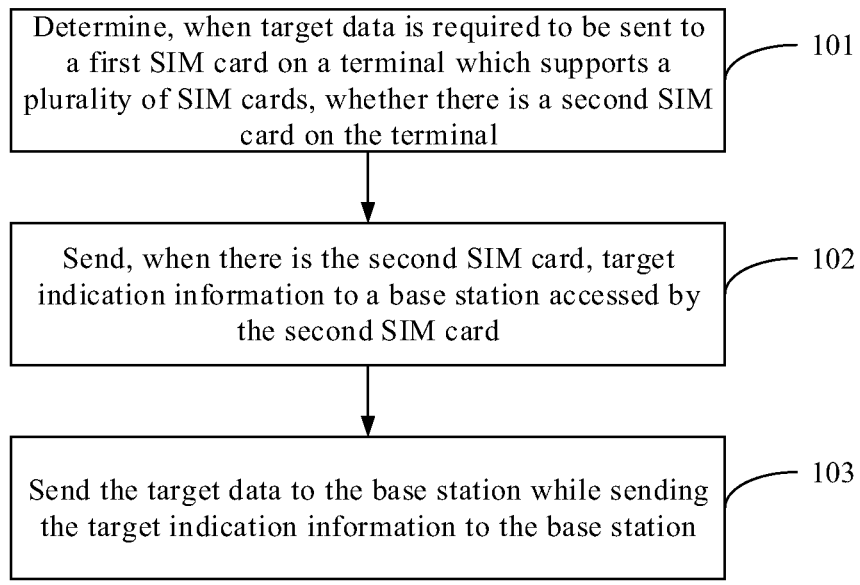
FIG. 2 is a flow chart of another data transmission method shown according to an example.

In an example, the target indication information includes first indication information, and the first indication information is used to inform the base station that the target data is data that is required to be sent to the first SIM card. Referring to FIG. 2, FIG. 2 is a flow chart of another data transmission method shown according to the example shown in FIG. 1. The method may further include:

In step 103, the target data is sent to the base station while the target indication information is sent to the base station.

In the examples of the disclosure, the core network may also send the target data to the base station while sending the target indication information to the base station, and the base station sends the target data to the first SIM card after establishing an RRC connection with the first SIM card. The target data may be sent to the first SIM card through the base station accessed by the second SIM card, whereby the delay of data transmission is reduced and the efficiency of data transmission is improved.

In an example, the target indication information may further include second indication information, and the second indication information is used to inform the base station that the first SIM card and the second SIM card belong to the same terminal.

In the examples of the disclosure, the target indication information may include first indication information and second indication information. After receiving the target data, the first indication information and the second indication information, the base station may still establish the RRC connection with the first SIM card and then send the target data to the first SIM card. Alternatively, the base station may directly send the target data to the second SIM card and then the second SIM card forwards the target data to the first SIM card. The resources otherwise required to establish the RRC connection with the first SIM card may be conserved, and the goal of reducing the delay of data transmission and improving the efficiency of data transmission may also be achieved.

Figure 3:
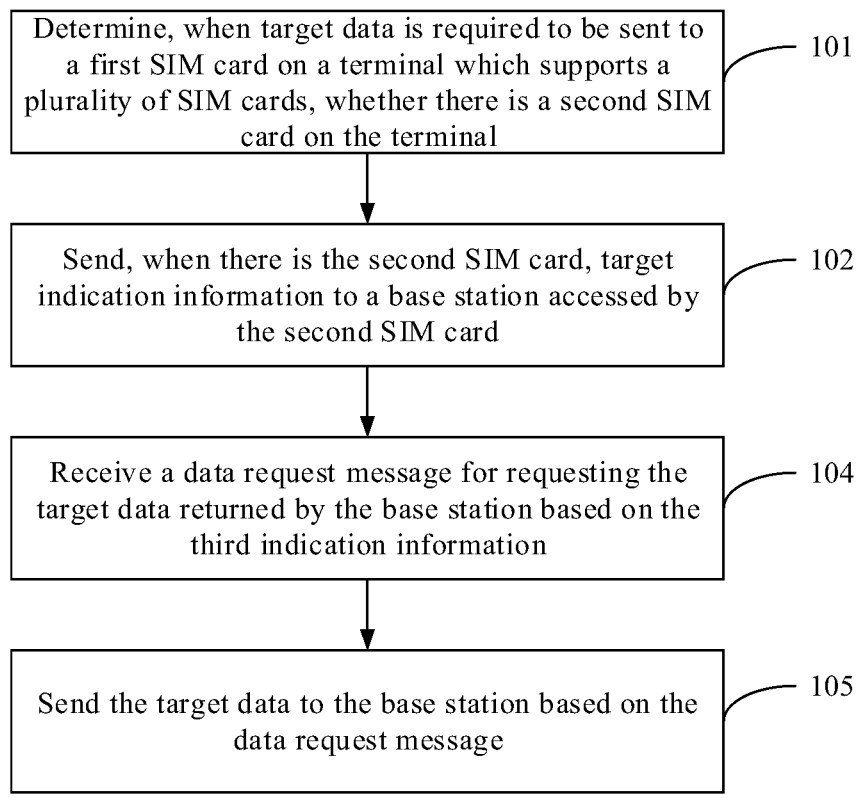
FIG. 3 is a flow chart of another data transmission method shown according to an example.

In an example, the target indication information includes third indication information, and the third indication information is used to inform the base station that the core network has the target data that is required to be sent to the first SIM card. Referring to FIG. 3, FIG. 3 is a flow chart of another data transmission method shown according to the example shown in FIG. 1. The method may further include:

In step 104, a data request message for requesting the target data returned by the base station based on the third indication information is received.

In step 105, the target data is sent to the base station based on the data request message.

In the examples of the disclosure, the target indication information may include third indication information. If the target data may be received, the base station accessed by the second SIM card may return the data request message for requesting the target data, and the core network sends the target data to the base station according to the data request message. The base station sends the target data to the first SIM card after establishing the RRC connection with the first SIM card. The goal of reducing the delay of data transmission and improving the efficiency of data transmission is thereby achieved.

In an example, the target indication information further includes second indication information, and the second indication information is used to inform the base station that the first SIM card and the second SIM card belong to the same terminal.

In the examples of the disclosure, the target indication information may include the second indication information and the third indication information, and the core network also sends the target data to the base station according to the data request message sent by the base station accessed by the second SIM card. The base station side may send the target data to the first SIM card after establishing the RRC connection with the first SIM card, or the base station side may send the target data to the second SIM card based on the second indication information and the third indication information and then the second SIM card forwards the target data to the first SIM card. The resource otherwise required to establish the RRC connection with the first SIM card may be conserved, and the goal of reducing the data transmission delay and improving the efficiency of data transmission may also be achieved.

In an example, the first SIM card is a SIM card in an IDLE state on the terminal, and the second SIM card is a SIM card that belongs to a same operator as the first SIM card and is in a connected state on the terminal.

In the examples of the disclosure, the first SIM card is the SIM card in the IDLE state on the terminal, and the second SIM card is the SIM card that belongs to the same operator as the first SIM card and is in the connected state on the terminal, so that the availability is high.

Next, the above data transmission method provided by the examples of the disclosure will be introduced below from the base station side.

Figure 4:
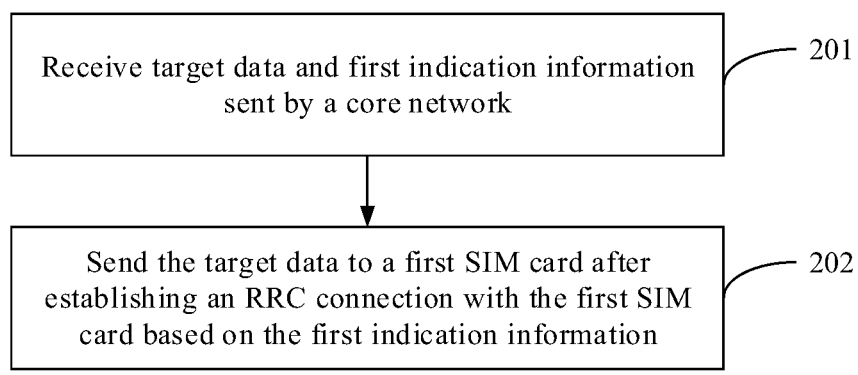
FIG. 4 is a flow chart of another data transmission method shown according to an example.

Examples of the disclosure provide a data transmission method which can be integrated in a base station accessed by a second SIM (Subscriber Identification Module) card on a terminal which supports a plurality of SIM cards. Referring to FIG. 4, FIG. 4 is a flow chart of a data transmission method shown according to an example. The method may include the following steps:

In step 201, target data and first indication information sent by a core network are received.

The first indication information is used to inform the base station that the target data is data that is required to be sent to a first SIM card.

In step 202, the target data is sent to the first SIM card after establishing an RRC (Radio Resource Control) connection with the first SIM card based on the first indication information.

In the above example, after receiving the target data and the first indication information sent by the core network, the base station establishes the RRC connection with the first SIM card according to the first indication information and sends the target data to the first SIM card, so that the core network may, without needing to page all the base stations in the TA of the first SIM card, send the target data to the first SIM card only through the base station accessed by the second SIM card, whereby the delay of data transmission is reduced and the efficiency of data transmission is improved.

In an example, the first SIM card is a SIM card in an IDLE state on the terminal, and the second SIM card is a SIM card that belongs to a same operator as the first SIM card and is in a connected state on the terminal.

Figure 5:
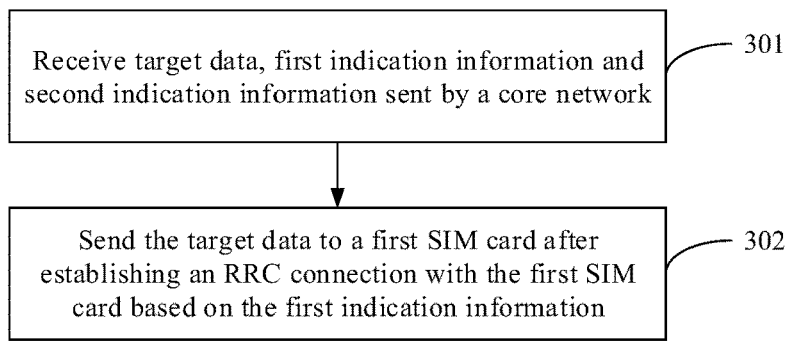
FIG. 5 is a flow chart of another data transmission method shown according to an example.

Examples of the disclosure provide a data transmission method which can be integrated in a base station accessed by a second SIM (Subscriber Identification Module) card on a terminal which supports a plurality of SIM cards. Referring to FIG. 5, FIG. 5 is a flow chart of a data transmission method shown according to an example. The method may include the following steps:

In step 301, target data, first indication information and second indication information sent by a core network are received.

The first indication information is used to inform the base station that the target data is data that is required to be sent to a first SIM card, and the second indication information is used to inform the base station that the first SIM card and the second SIM card belong to the same terminal.

In step 302, the target data is sent to the first SIM card after establishing an RRC (Radio Resource Control) connection with the first SIM card based on the first indication information.

In the examples of the disclosure, after receiving the target data, the first indication information and the second indication information sent by the core network, the base station establishes the RRC connection with the first SIM card according to the first indication information and sends the target data to the first SIM card, so that the core network may, without needing to page all the base stations in the TA of the first SIM card, send the target data to the first SIM card only through the base station accessed by the second SIM card, whereby the delay of data transmission is reduced and the efficiency of data transmission is improved.

In an example, the first SIM card is a SIM card in the IDLE state on the terminal, and the second SIM card is a SIM card that belongs to a same operator as the first SIM card and is in a connected state on the terminal.

Figure 6:
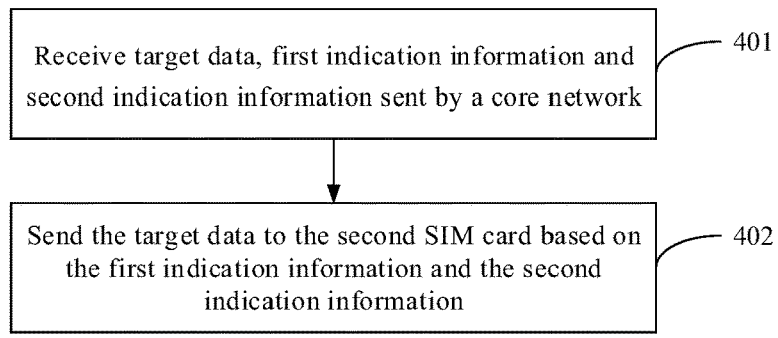
FIG. 6 is a flow chart of another data transmission method shown according to an example.

Examples of the disclosure provide a data transmission method which can be integrated in a base station accessed by a second SIM (Subscriber Identification Module) card on a terminal which supports a plurality of SIM cards. Referring to FIG. 6, FIG. 6 is a flow chart of a data transmission method shown according to an example. The method may include the following steps:

In step 401, target data, first indication information and second indication information sent by a core network are received.

The first indication information is used to inform the base station that the target data is data that is required to be sent to a first SIM card, and the second indication information is used to inform the base station that the first SIM card and the second SIM card belong to the same terminal.

In step 402, the target data is sent to the second SIM card based on the first indication information and the second indication information.

In the examples of the disclosure, the base station may send the target data to the second SIM card after receiving the second indication information, and the second SIM card forwards the target data to the first SIM card, so that the consumed resource required to establish the RRC connection with the first SIM card may be saved.

In an example, the first SIM card is a SIM card in an IDLE state on the terminal, and the second SIM card is a SIM card that belongs to a same operator as the first SIM card and is in a connected state on the terminal.

Figure 7:
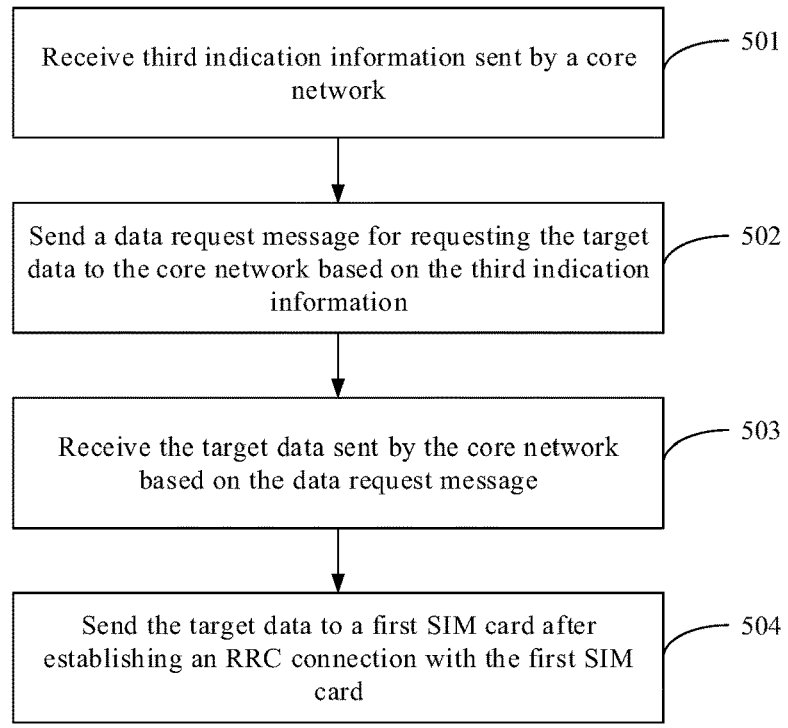
FIG. 7 is a flow chart of another data transmission method shown according to an example.

Examples of the disclosure provide a data transmission method which can be applied for a base station accessed by a second SIM (Subscriber Identification Module) card on a terminal which supports a plurality of SIM cards. Referring to FIG. 7, FIG. 7 is a flow chart of a data transmission method shown according to an example. The method may include the following steps:

In step 501, third indication information sent by a core network is received.

The third indication information is used to inform the base station that the core network has target data that is required to be sent to a first SIM card of the terminal.

In step 502, a data request message for requesting the target data is sent to the core network based on the third indication information.

In step 503, the target data sent by the core network based on the data request message is received.

In step 504, the target data is sent to the first SIM card after establishing an RRC (Radio Resource Control) connection with the first SIM card.

In the examples of the disclosure, after receiving the third indication information sent by the core network, the base station may send the data request message for requesting the target data to the core network after confirming that the target data may be received, and then the base station may receive the target data sent by the core network and send the target data to the first SIM card after establishing the RRC connection with the first SIM card, so that the core network may, without needing to page all the base stations in the TA of the first SIM card, send the target data to the first SIM card only through the base station accessed by the second SIM card, whereby the delay of data transmission is reduced and the efficiency of data transmission is improved.

In an example, the first SIM card is a SIM card in the IDLE state on the terminal, and the second SIM card is a SIM card that belongs to a same operator as the first SIM card and is in a connected state on the terminal.

Figure 8:
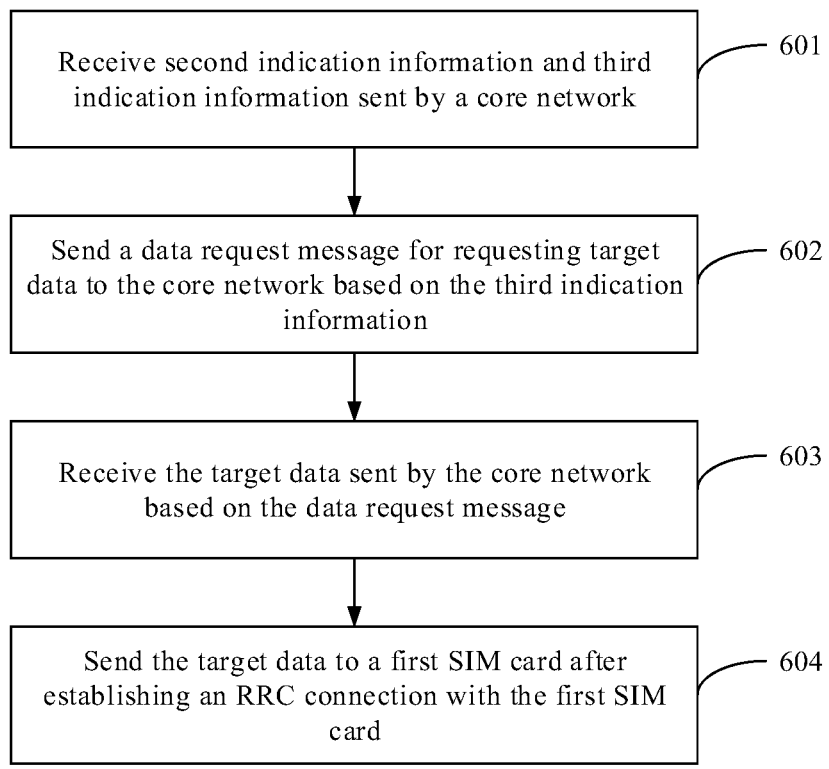
FIG. 8 is a flow chart of another data transmission method shown according to an example.

Examples of the disclosure provide a data transmission method which can be integrated in a base station accessed by a second SIM (Subscriber Identification Module) card on a terminal which supports a plurality of SIM cards. Referring to FIG. 8, FIG. 8 is a flow chart of a data transmission method shown according to an example. The method may include the following steps:

In step 601, second indication information and third indication information sent by a core network are received.

The second indication information is used to inform the base station that a first SIM card and the second SIM card belong to the same terminal, and the third indication information is used to inform the base station that the core network has target data that is required to be sent to the first SIM card of the terminal.

In step 602, a data request message for requesting the target data is sent to the core network based on the third indication information.

In step 603, the target data sent by the core network based on the data request message is received.

In step 604, the target data is sent to the first SIM card after establishing an RRC (Radio Resource Control) connection with the first SIM card.

In the examples of the disclosure, after receiving the second indication information and the third indication information sent by the core network, the base station may send the data request message for requesting the target data to the core network after confirming that the target data may be received, and then the base station may receive the target data sent by the core network and send the target data to the first SIM card after establishing the RRC connection with the first SIM card, so that the core network may, without needing to page all the base stations in the TA of the first SIM card, send the target data to the first SIM card only through the base station accessed by the second SIM card, whereby the delay of data transmission is reduced and the efficiency of data transmission is improved.

In an example, the first SIM card is a SIM card in an IDLE state on the terminal, and the second SIM card is a SIM card that belongs to a same operator as the first SIM card and is in a connected state on the terminal.

Figure 9:
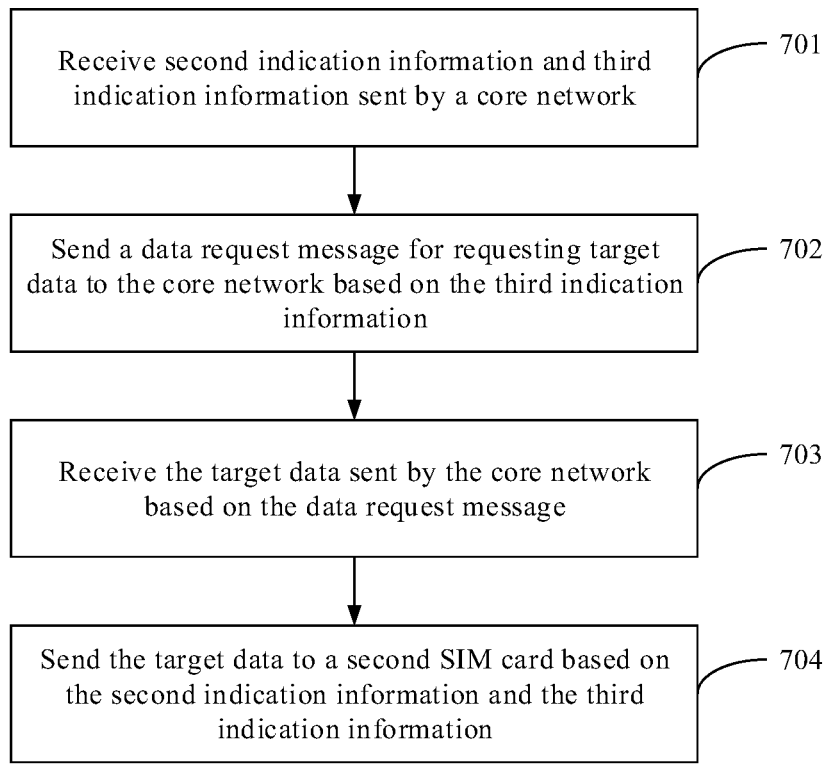
FIG. 9 is a flow chart of another data transmission method shown according to an example.

Examples of the disclosure provide a data transmission method which can be applied for a base station accessed by a second SIM (Subscriber Identification Module) card on a terminal which supports a plurality of SIM cards. Referring to FIG. 9, FIG. 9 is a flow chart of a data transmission method according to an example. The method may include the following steps:

In step 701, second indication information and third indication information sent by a core network are received.

The second indication information is used to inform the base station that a first SIM card and the second SIM card belong to the same terminal, and the third indication information is used to inform the base station that the core network has target data that is required to be sent to the first SIM card of the terminal.

In step 702, a data request message for requesting the target data is sent to the core network based on the third indication information.

In step 703, the target data sent by the core network based on the data request message is received.

In step 704, the target data is sent to the second SIM card based on the second indication information and the third indication information.

In the examples of the disclosure, in the case where the target data may be received, the base station receives the target data sent by the core network, and sends the target data to the first SIM card through the second SIM card according to the second indication information and the third indication information, so that the resource otherwise required to establish the RRC connection with the first SIM card may be conserved.

In an example, the first SIM card is a SIM card in an IDLE state on the terminal, and the second SIM card is a SIM card that belongs to a same operator as the first SIM card and is in a connected state on the terminal.

Then, a data transmission process between a core network and a base station will be introduced below based on the above data transmission method provided by the examples of the disclosure.

Figure 10:
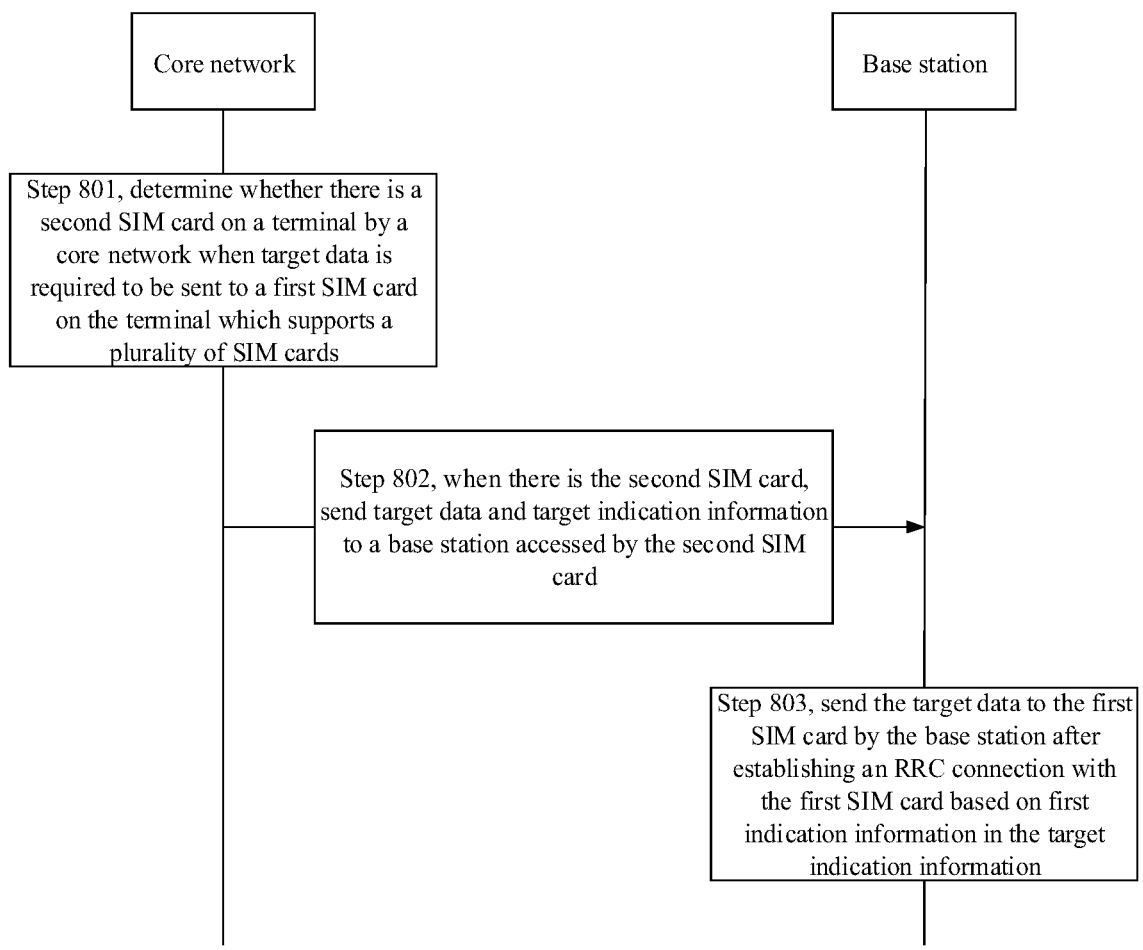
FIG. 10 is a flow chart of another data transmission method shown according to an example.

Examples of the disclosure provide a data transmission method. Referring to FIG. 10, FIG. 10 is a flow chart of a data transmission method according to an example. The method may include the following steps:

In step 801, when target data is required to be sent to a first SIM (Subscriber Identification Module) card on a terminal which supports a plurality of SIM cards, a core network determines whether there is a second SIM card on the terminal.

In step 802, when there is the second SIM card, target data and target indication information are sent to a base station accessed by the second SIM card.

The target indication information includes first indication information, and the first indication information is used to inform the base station that the target data is data that is required to be sent to the first SIM card.

In step 803, the base station sends the target data to the first SIM card after establishing an RRC connection with the first SIM card based on the first indication information in the target indication information.

In the above example, when the target data is required to be sent to the first SIM card on the terminal, the core network does not need to page all base stations in the TA of the first SIM card. The core network only needs to send the target data and the target indication information to the base station accessed by the second SIM card, and the base station sends the target data to the first SIM card, such that the delay of data transmission is reduced and the efficiency of data transmission is improved.

Figure 11:
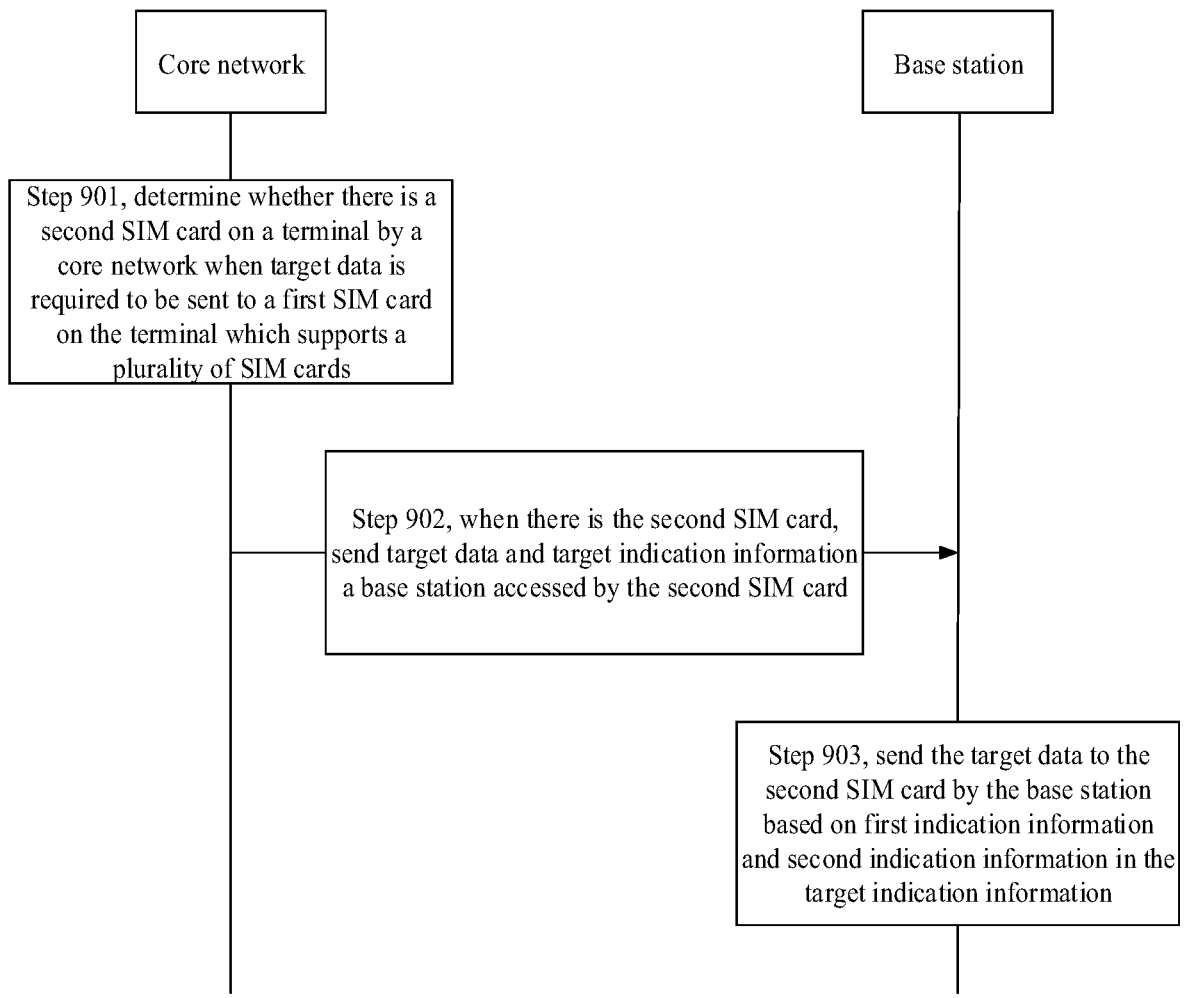
FIG. 11 is a flow chart of another data transmission method shown according to an example.

Examples of the disclosure further provide another data transmission method. Referring to FIG. 11, FIG. 11 is a flow chart of another data transmission method shown according to an example. The method may include the following steps:

In step 901, when target data is required to be sent to a first SIM (Subscriber Identification Module) card on a terminal which supports a plurality of SIM cards, a core network determines whether there is a second SIM card on the terminal.

In step 902, when there is the second SIM card, target data and target indication information are sent to a base station accessed by the second SIM card.

The target indication information includes first indication information and second indication information. The first indication information is used to inform the base station that the target data is data that is required to be sent to the first SIM card. The second indication information is used to inform the base station that the first SIM card and the second SIM card belong to the same terminal.

In step 903, the base station sends the target data to the second SIM card based on the first indication information and the second indication information in the target indication information.

In the above example, when the target data is required to be sent to the first SIM card on the terminal, the core network does not need to page all base stations in the TA of the first SIM card. The core network only needs to send the target data and the target indication information to the base station accessed by the second SIM card, and the base station sends the target data to the first SIM card through the second SIM card based on the first indication information and the second indication information in the target indication information, so that the delay of data transmission is reduced, the efficiency of data transmission is improved, and moreover, the resource otherwise required to establish the RRC connection with the first SIM card by the base station may be conserved.

Figure 12:
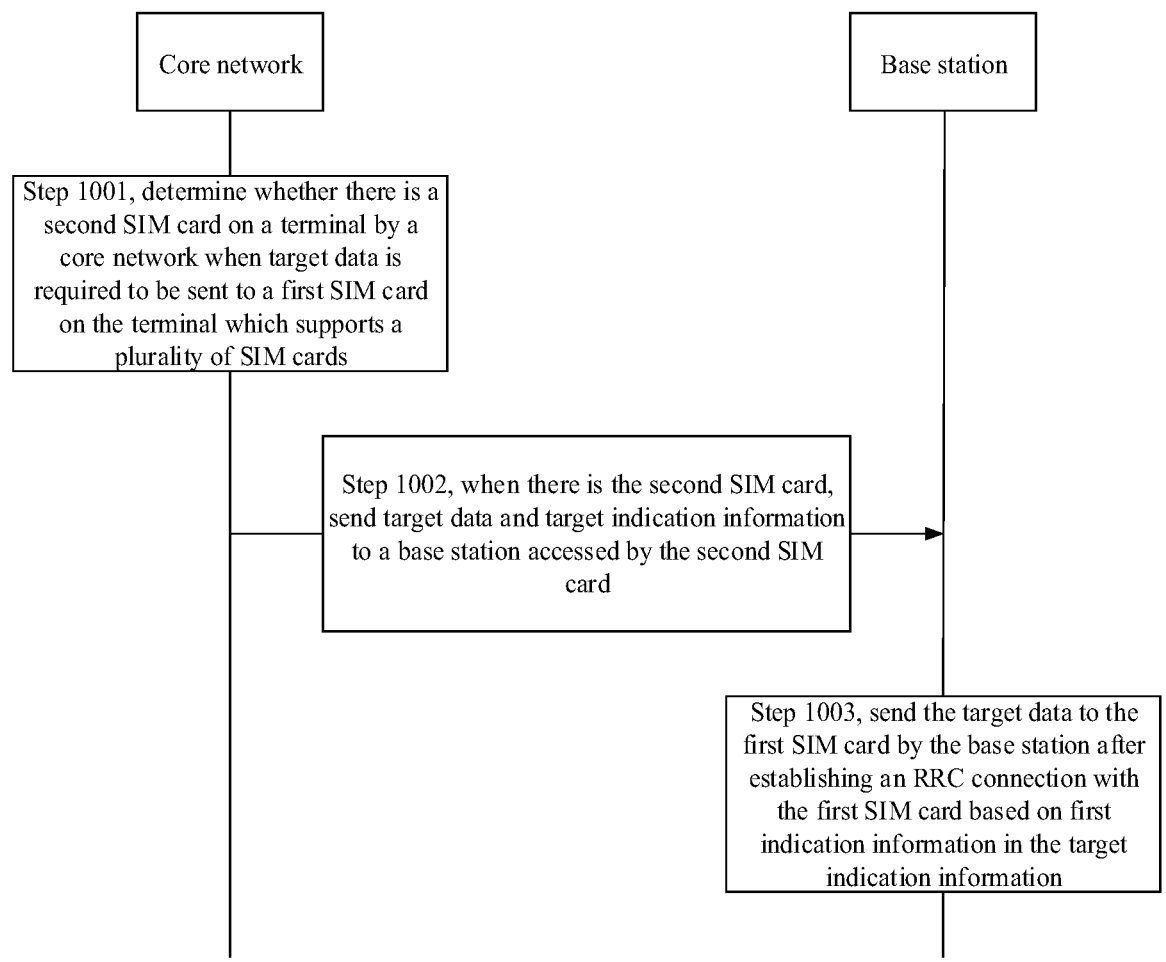
FIG. 12 is a flow chart of another data transmission method shown according to an example.

Examples of the disclosure further provide another data transmission method. Referring to FIG. 12, FIG. 12 is a flow chart of a data transmission method according to an example. The method may include the following steps:

In step 1001, when target data is required to be sent to a first SIM (Subscriber Identification Module) card on a terminal which supports a plurality of SIM cards, a core network determines whether there is a second SIM card on the terminal.

In step 1002, when there is the second SIM card, target data and target indication information are sent to a base station accessed by the second SIM card.

The target indication information includes first indication information and second indication information. The first indication information is used to inform the base station that the target data is data that is required to be sent to the first SIM card. The second indication information is used to inform the base station that the first SIM card and the second SIM card belong to the same terminal.

In step 1003, the base station sends the target data to the first SIM card after establishing an RRC connection with the first SIM card based on the first indication information in the target indication information.

In the above example, when the target data is required to be sent to the first SIM card on the terminal, the core network does not need to page all base stations in the TA of the first SIM card. The core network only needs to send the target data and the target indication information to the base station accessed by the second SIM card, and the base station sends the target data to the first SIM card based on the first indication information in the target indication information, so that the delay of data transmission is reduced and the efficiency of data transmission is improved.

Figure 13:
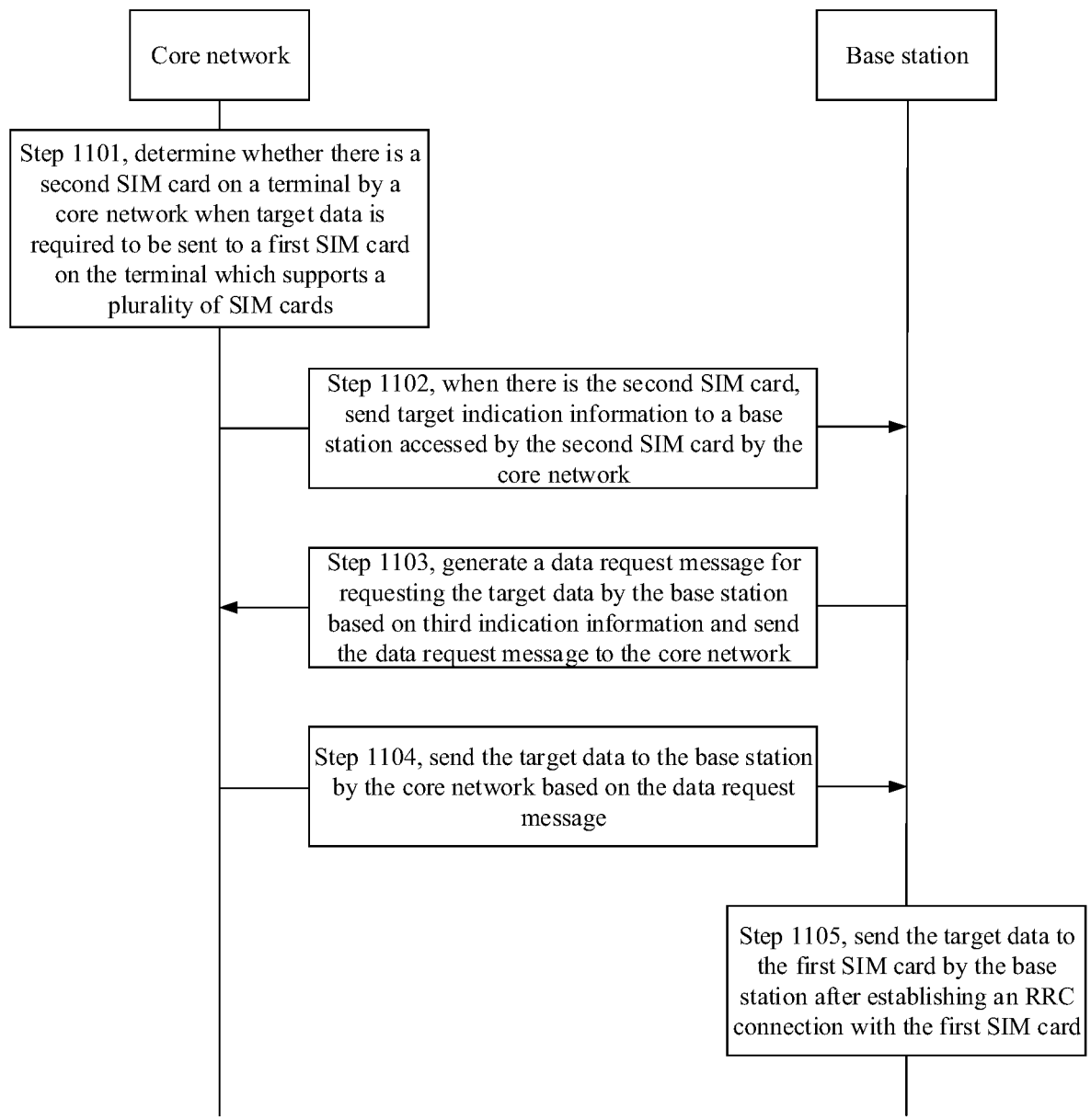
FIG. 13 is a flow chart of another data transmission method shown according to an example.

Examples of the disclosure further provide another data transmission method. Referring to FIG. 13, FIG. 13 is a flow chart of a data transmission method shown according to an example. The method may include the following steps:

In step 1101, when target data is required to be sent to a first SIM (Subscriber Identification Module) card on a terminal which supports a plurality of SIM cards, a core network determines whether there is a second SIM card on the terminal.

In step 1102, when there is the second SIM card, the core network sends target indication information to a base station accessed by the second SIM card.

The target indication information includes third indication information, and the third indication information is used to inform the base station that the core network has target data that is required to be sent to a first SIM card.

In step 1103, the base station generates a data request message for requesting the target data and sends the data request message to the core network based on the third indication information in the target indication information.

In step 1104, the core network sends the target data to the base station based on the data request message.

In step 1105, the base station sends the target data to the first SIM card after establishing an RRC connection with the first SIM card.

In the above example, when the target data is required to be sent to the first SIM card on the terminal, the core network does not need to page all base stations in the TA of the first SIM card. The core network only needs to send the target indication information to the base station accessed by the second SIM card so as to determine whether the target data may be received by the base station. If the target data may be received, the base station sends the data request message to the core network, the core network sends the target data to the base station, and the base station sends the target data to the first SIM card, so that the delay of data transmission is reduced and the efficiency of data transmission is improved.

Figure 14:
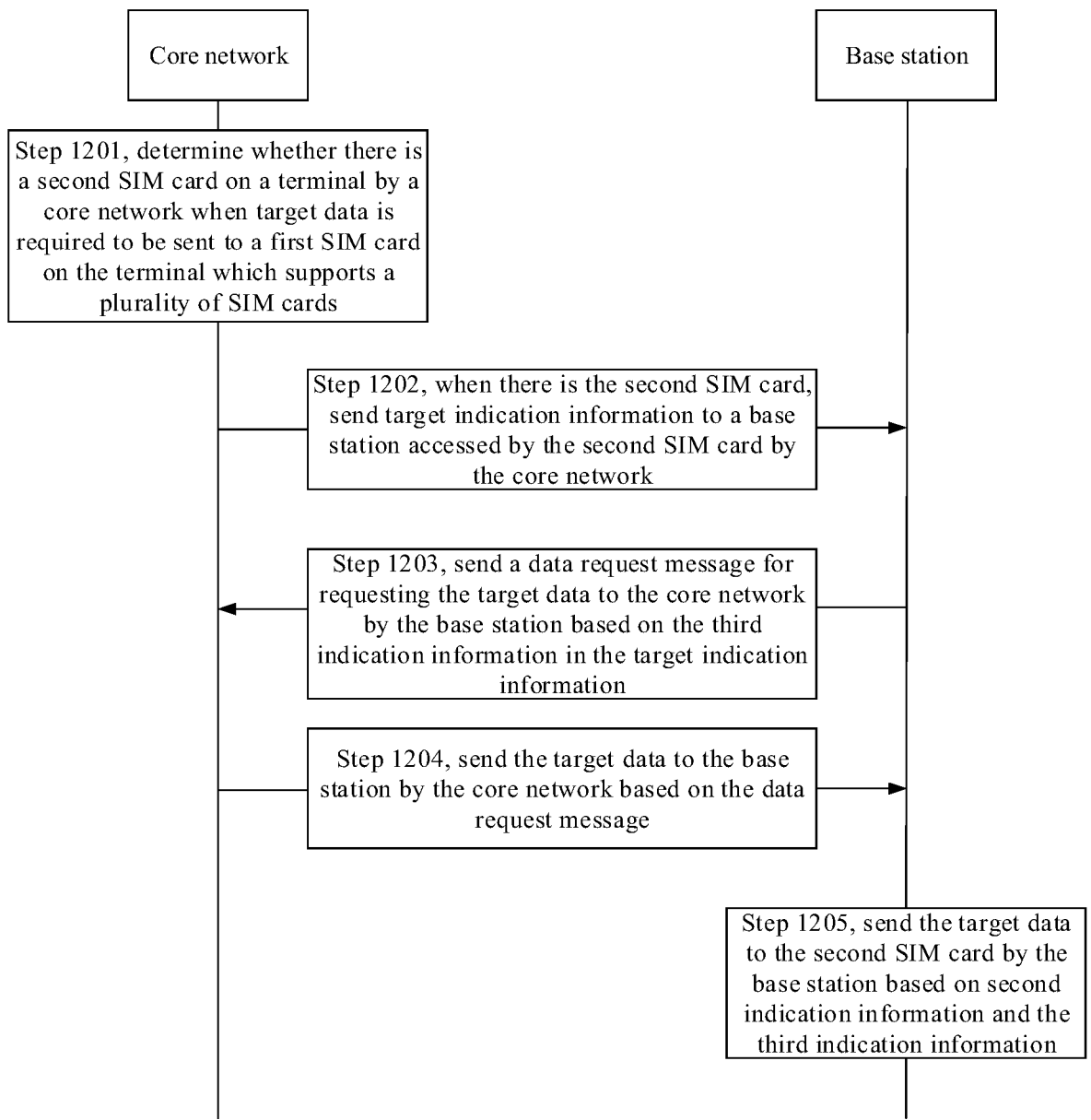
FIG. 14 is a flow chart of another data transmission method shown according to an example.

Examples of the disclosure provide a data transmission method. Referring to FIG. 14, FIG. 14 is a flow chart of a data transmission method shown according to an example. The method may include the following steps:

In step 1201, when target data is required to be sent to a first SIM (Subscriber Identification Module) card on a terminal which supports a plurality of SIM cards, a core network determines whether there is a second SIM card on the terminal.

In step 1202, when there is the second SIM card, the core network sends target indication information to a base station accessed by the second SIM card.

The target indication information includes second indication information and third indication information. The second indication information is used to inform the base station that the first SIM card and the second SIM card belong to the same terminal, and the third indication information is used to inform the base station that the core network has target data that is required to be sent to the first SIM card.

In step 1203, the base station sends a data request message for requesting the target data to the core network based on the third indication information in the target indication information.

In step 1204, the core network sends the target data to the base station based on the data request message.

In step 1205, the base station sends the target data to the second SIM card based on the second indication information and the third indication information.

In the above example, the core network may send the second indication information to the base station while sending the third indication information to the base station. The core network may also send the second indication information to the base station after sending the third indication information to the base station. The core network may also send the second indication information to the base station before sending the third indication information to the base station.

In the above example, when the target data is required to be sent to the first SIM card on the terminal, the core network does not need to page all base stations in the TA of the first SIM card. The core network only needs to send the target indication information to the base station accessed by the second SIM card so as to determine whether the target data may be received by the base station. If the target data may be received, the base station sends the data request message to the core network, the core network sends the target data to the base station, and the base station sends the target data to the first SIM card through the second SIM card based on the second indication information and the third indication information in the target indication information, so that the delay of data transmission is reduced, the efficiency of data transmission is improved, and moreover, the resources otherwise required to establish the RRC connection with the first SIM card by the base station may be conserved.

Figure 15:
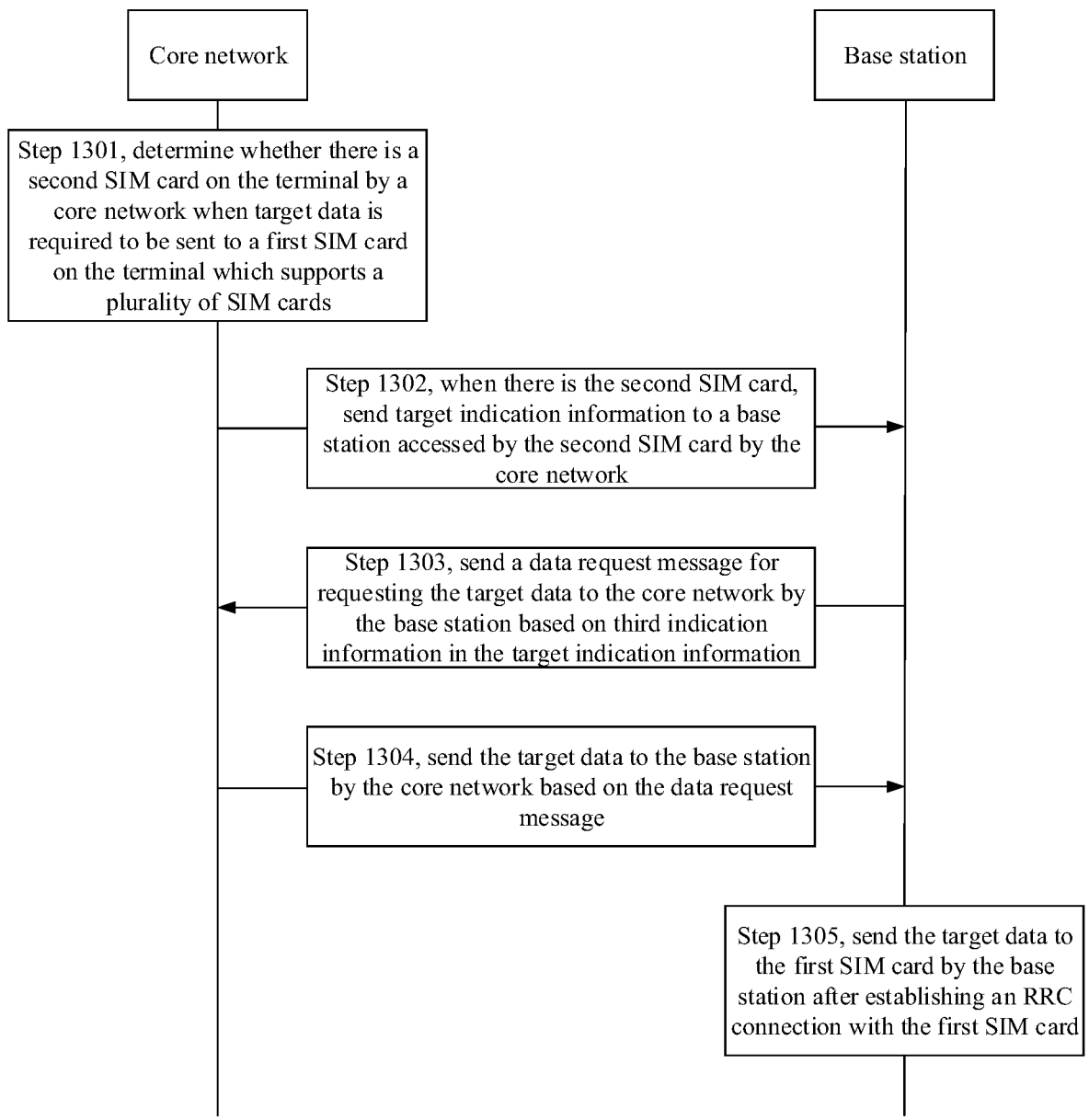
FIG. 15 is a flow chart of another data transmission method shown according to an example.

Examples of the disclosure further provide another data transmission method. Referring to FIG. 15, FIG. 15 is a flow chart of a data transmission method shown according to an example. The method may include the following steps:

In step 1301, when target data is required to be sent to a first SIM (Subscriber Identification Module) card on a terminal which supports a plurality of SIM cards, a core network determines whether there is a second SIM card on the terminal.

In step 1302, when there is the second SIM card, the core network sends target indication information to a base station accessed by the second SIM card.

The target indication information includes second indication information and third indication information. The second indication information is used to inform the base station that the first SIM card and the second SIM card belong to the same terminal, and the third indication information is used to inform the base station that the core network has target data that is required to be sent to the first SIM card.

In step 1303, the base station sends a data request message for requesting the target data to the core network based on the third indication information in the target indication information.

In step 1304, the core network sends the target data to the base station based on the data request message.

In step 1305, the base station sends the target data to the first SIM card after establishing an RRC connection with the first SIM card.

In this example, the core network may send the second indication information to the base station while sending the third indication information to the base station. The core network may also send the second indication information to the base station after sending the third indication information to the base station. The core network may also send the second indication information to the base station before sending the third indication information to the base station.

In the above example, when the target data is required to be sent to the first SIM card on the terminal, the core network does not need to page all base stations in the TA of the first SIM card. The core network only needs to send the target indication information to the base station accessed by the second SIM card so as to determine whether the target data may be received by the base station. If the target data may be received, the base station sends the data request message to the core network, the core network sends the target data to the base station, and the base station sends the target data to the first SIM card after establishing the RRC connection with the first SIM card, so that the delay of data transmission is reduced and the efficiency of data transmission is improved.

Corresponding to the examples of the aforementioned method including functional steps, the disclosure further provides examples of an apparatus implementing the functional steps, and a sending apparatus and a receiving apparatus corresponding thereto.

Figure 16:
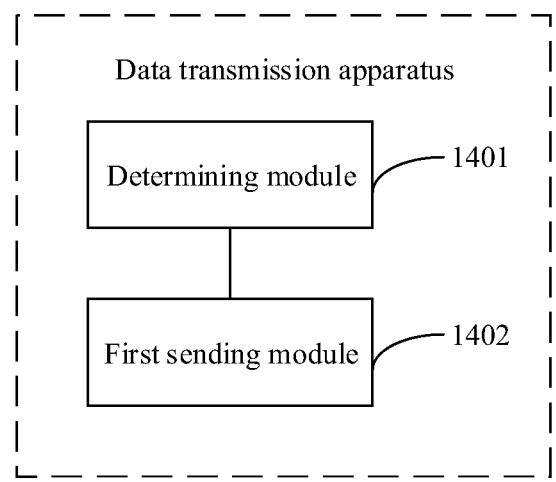
FIG. 16 is a block diagram of a data transmission apparatus shown according to an example.

Referring to FIG. 16, FIG. 16 is a block diagram of a data transmission apparatus shown according to an example. The apparatus is integrated in a core network, including:

a determining module 1401, configured to determine, when target data is required to be sent to a first SIM (Subscriber Identification Module) card on a terminal which supports a plurality of SIM cards, whether there is a second SIM card on the terminal; and a first sending module 1402, configured to send, when there is the second SIM card, target indication information to a base station accessed by the second SIM card.

Figure 17:
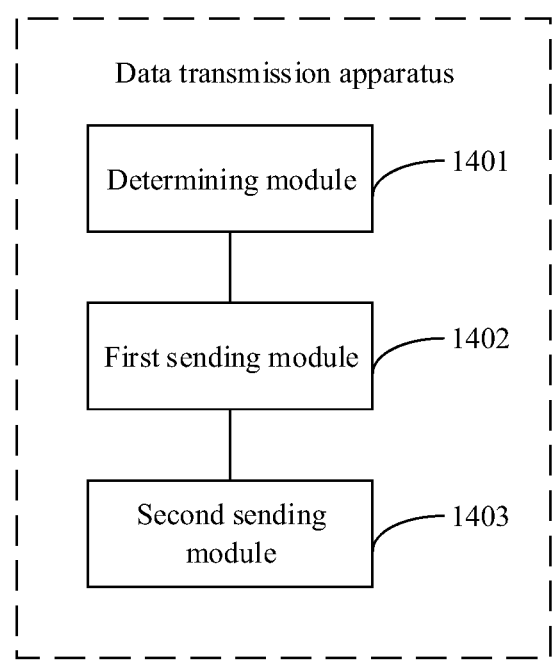
FIG. 17 is a block diagram of another data transmission apparatus shown according to an example.

In an example, the target indication information includes first indication information, and the first indication information is used to inform the base station that the target data is data that is required to be sent to the first SIM card. Referring to FIG. 17, FIG. 17 is a block diagram of a data transmission apparatus shown according to an example. The apparatus may further include:

a second sending module 1403, configured to send the target data to the base station while the first sending module sends the target indication information to the base station.

In an example, the target indication information further includes second indication information, and the second indication information is used to inform the base station that the first SIM card and the second SIM card belong to the same terminal.

Figure 18:
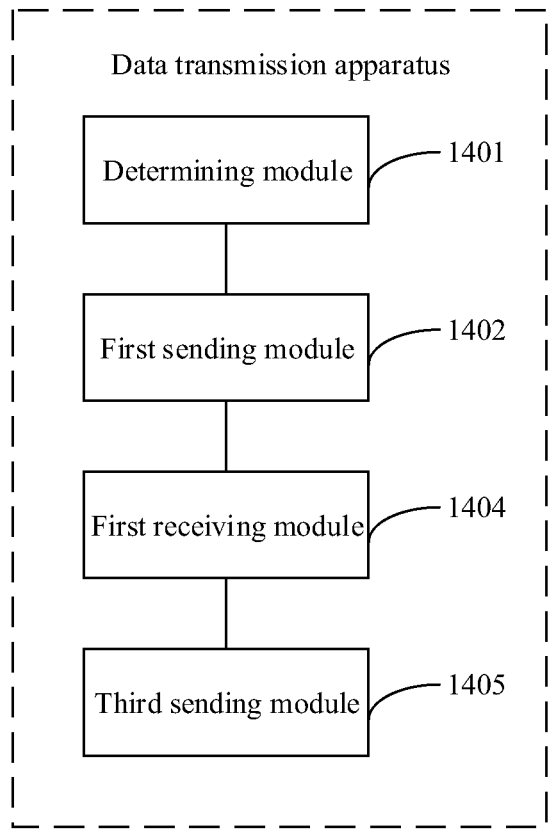
FIG. 18 is a block diagram of another data transmission apparatus shown according to an example.

In an example, the target indication information includes third indication information, and the third indication information is used to inform the base station that the core network has the target data that is required to be sent to the first SIM card. Referring to FIG. 18, FIG. 18 is a block diagram of a data transmission apparatus shown according to an example. The apparatus may further include:

a first receiving module 1404, configured to receive a data request message for requesting the target data returned by the base station based on the third indication information; and a third sending module 1405, configured to send the target data to the base station based on the data request message.

In an example, the target indication information further includes second indication information, and the second indication information is used to inform the base station that the first SIM card and the second SIM card belong to the same terminal.

In some embodiments, the first SIM card is a SIM card in an IDLE state on the terminal, and the second SIM card is a SIM card that belongs to a same operator as the first SIM card and is in a connected state on the terminal.

Figure 19:
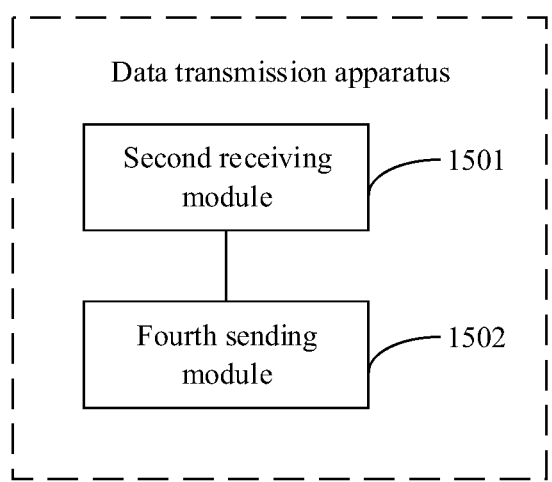
FIG. 19 is a block diagram of another data transmission apparatus shown according to an example.

Referring to FIG. 19, FIG. 19 is a block diagram of a data transmission apparatus shown according to an example. The apparatus is integrated in a base station accessed by a second SIM (Subscriber Identification Module) card on a terminal which supports a plurality of SIM cards, and includes:
- a second receiving module 1501, configured to receive target data and first indication information sent by a core network, where the first indication information is used to inform the base station that the target data is data that is required to be sent to a first SIM card; and
- a fourth sending module 1502, configured to send the target data to the first SIM card after establishing an RRC (Radio Resource Control) connection with the first SIM card based on the first indication information.

In some embodiments, the first SIM card is a SIM card in an IDLE state on the terminal, and the second SIM card is a SIM card that belongs to a same operator as the first SIM card and is in a connected state on the terminal.

Figure 20A:
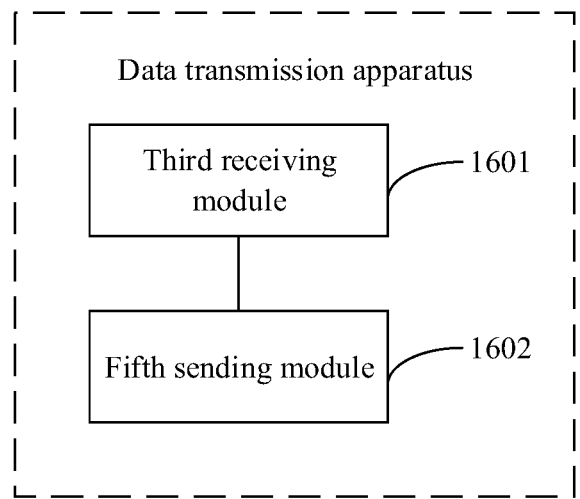
FIG. 20A is a block diagram of another data transmission apparatus shown according to an example.

Referring to FIG. 20A, FIG. 20A is a block diagram of a data transmission apparatus shown according to an example. The apparatus is integrated in a base station accessed by a second SIM (Subscriber Identification Module) card on a terminal which supports a plurality of SIM cards, including:
- a third receiving module 1601, configured to receive target data, first indication information and second indication information sent by a core network, where the first indication information is used to inform the base station that the target data is data that is required to be sent to the first SIM card, and the second indication information is used to inform the base station that the first SIM card and the second SIM card belong to the same terminal; and
- a fifth sending module 1602, configured to send the target data to the first SIM card after establishing an RRC (Radio Resource Control) connection with the first SIM card based on the first indication information.

In some embodiments, the first SIM card is a SIM card in an IDLE state on the terminal, and the second SIM card is a SIM card that belongs to a same operator as the first SIM card and is in a connected state on the terminal.

Figure 20B:
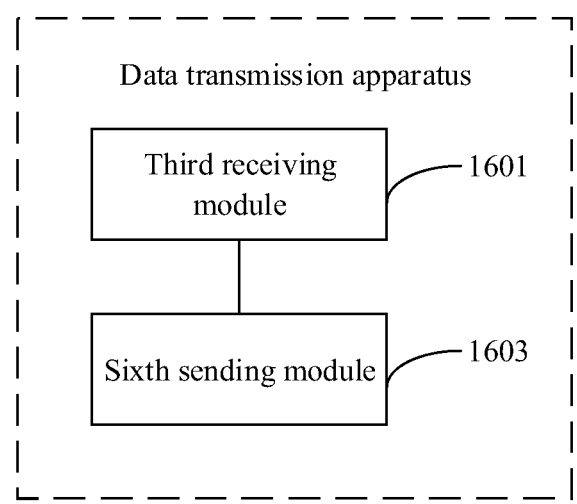
FIG. 20B is a block diagram of another data transmission apparatus shown according to an example.

Referring to FIG. 20B, FIG. 20B is a block diagram of a data transmission apparatus shown according to an example. The apparatus is applied for a base station accessed by a second SIM (Subscriber Identification Module) card on a terminal which supports a plurality of SIM cards, including:
- a third receiving module 1601, configured to receive target data, first indication information and second indication information sent by a core network, where the first indication information is used to inform the base station that the target data is data that is required to be sent to the first SIM card, and the second indication information is used to inform the base station that the first SIM card and the second SIM card belong to the same terminal; and
- a sixth sending module 1603, configured to send the target data to the second SIM card based on the first indication information and the second indication information.

In some embodiments, the first SIM card is a SIM card in an IDLE state on the terminal, and the second SIM card is a SIM card that belongs to a same operator as the first SIM card and is in a connected state on the terminal.

Figure 21:
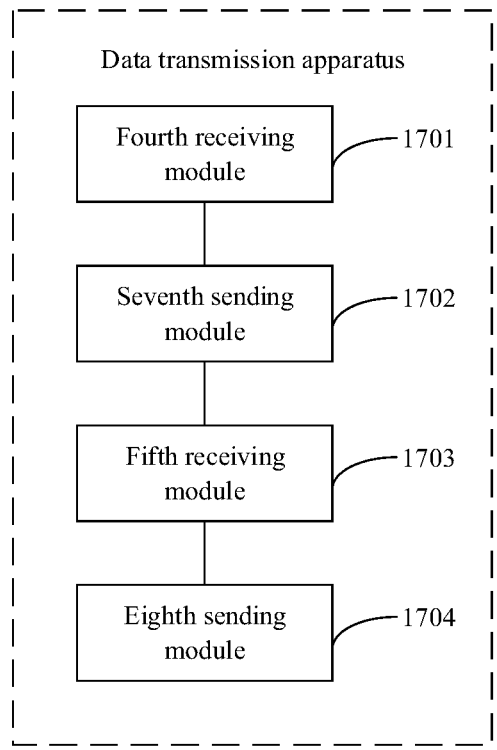
FIG. 21 is a block diagram of another data transmission apparatus shown according to an example.

Referring to FIG. 21, FIG. 21 is a block diagram of a data transmission apparatus shown according to an example. The apparatus is applied for a base station accessed by a second SIM (Subscriber Identification Module) card on a terminal which supports a plurality of SIM cards, including:
- a fourth receiving module 1701, configured to receive third indication information sent by a core network, where the third indication information is used to inform the base station that the core network has target data that is required to be sent to a first SIM card of the terminal;
- a seventh sending module 1702, configured to send a data request message for requesting the target data to the core network based on the third indication information;
- a fifth receiving module 1703, configured to receive the target data sent by the core network based on the data request message; and
- an eighth sending module 1704, configured to send the target data to the first SIM card after establishing an RRC (Radio Resource Control) connection with the first SIM card.

In some embodiments, the first SIM card is a SIM card in an IDLE state on the terminal, and the second SIM card is a SIM card that belongs to a same operator as the first SIM card and is in a connected state on the terminal.

Figure 22A:
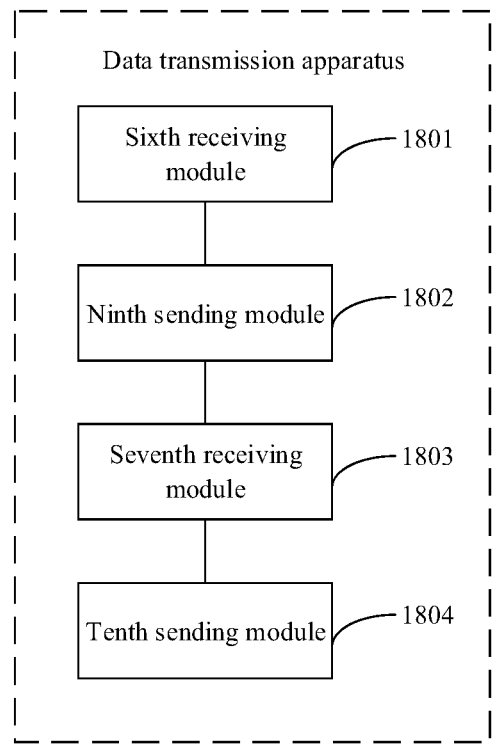
FIG. 22A is a block diagram of another data transmission apparatus shown according to an example.

Referring to FIG. 22A, FIG. 22A is a block diagram of a data transmission apparatus shown according to an example. The apparatus is applied for a base station accessed by a second SIM (Subscriber Identification Module) card on a terminal which supports a plurality of SIM cards, including:
- a sixth receiving module 1801, configured to receive second indication information and third indication information sent by a core network, where the second indication information is used to inform the base station that the first SIM card and the second SIM card belong to the same terminal, and the third indication information is used to inform the base station that the core network has target data that is required to be sent to the first SIM card of the terminal;
- a ninth sending module 1802, configured to send a data request message for requesting the target data to the core network based on the third indication information;
- a seventh receiving module 1803, configured to receive the target data sent by the core network based on the data request message; and
- a tenth sending module 1804, configured to send the target data to the first SIM card after establishing an RRC (Radio Resource Control) connection with the first SIM card.

In some embodiments, the first SIM card is a SIM card in an IDLE state on the terminal, and the second SIM card is a SIM card that belongs to a same operator as the first SIM card and is in a connected state on the terminal.

Figure 22B:
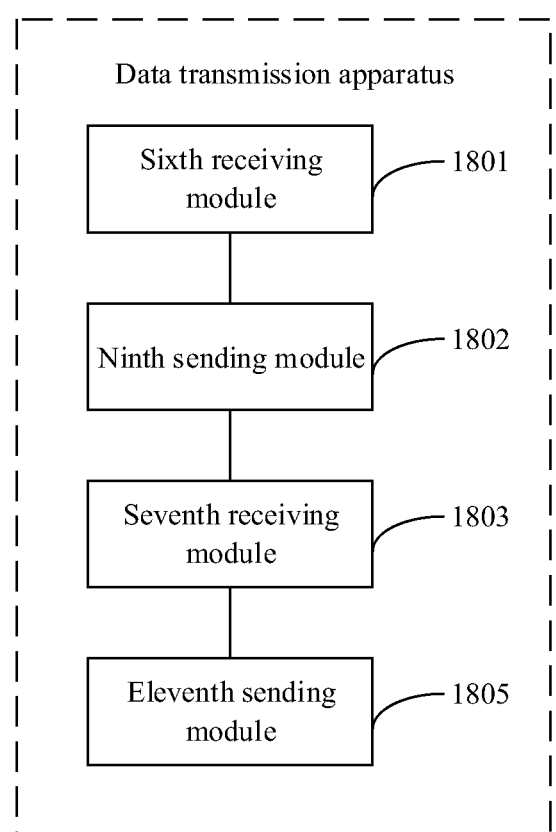
FIG. 22B is a block diagram of another data transmission apparatus shown according to an example.

Referring to FIG. 22B, FIG. 22B is a block diagram of a data transmission apparatus shown according to an example. The apparatus is applied for a base station accessed by a second SIM (Subscriber Identification Module) card on a terminal which supports a plurality of SIM cards, including:
- a sixth receiving module 1801, configured to receive second indication information and third indication information sent by a core network, where the second indication information is used to inform the base station that the first SIM card and the second SIM card belong to the same terminal, and the third indication information is used to inform the base station that the core network has target data that is required to be sent to the first SIM card of the terminal;

a ninth sending module 1802, configured to send a data request message for requesting the target data to the core network based on the third indication information;

a seventh receiving module 1803, configured to receive the target data sent by the core network based on the data request message; and an eleventh sending module 1805, configured to send the target data to the second SIM card based on the second indication information and the third indication information.

In some embodiments, the first SIM card is a SIM card in an IDLE state on the terminal, and the second SIM card is a SIM card that belongs to a same operator as the first SIM card and is in a connected state on the terminal.

Since the apparatus examples basically correspond to the method examples, for the relevant parts, reference may be made to the corresponding parts of the description of the method examples. The apparatus examples described above are only illustrative. The units described as separate components may or may not be physically separated, and the components displayed as units may or may not be physical units, that is, they may be located in one place, or may be distributed in a plurality of network units. Part or all of the modules may be selected according to actual needs to achieve the purposes of the solution of the disclosure. Those of ordinary skill in the art can understand and implement the modules without creative work.

Correspondingly, the disclosure further provides a computer-readable storage medium. The storage medium stores a computer program, and the computer program comprises processor executable instructions that configure a processor to implement any one of the above data transmission methods integrated in the core network side.

Correspondingly, the disclosure further provides a computer-readable storage medium. The storage medium stores a computer program, and the computer program comprises processor-executable instructions that configure a processor to implement any one of the above data transmission methods integrated in a base station side accessed by a second SIM (Subscriber Identification Module) card on a terminal which supports a plurality of SIM cards.

Correspondingly, the disclosure further provides a data transmission apparatus. The apparatus is applied for a core network, including:

a processor; and a memory for storing processor executable instructions.

The processor is configured to:

determine, when target data is required to be sent to a first SIM (Subscriber Identification Module) card on a terminal which supports a plurality of SIM cards, whether there is a second SIM card on the terminal; and send, when there is the second SIM card, target indication information to a base station accessed by the second SIM card.

Figure 23:
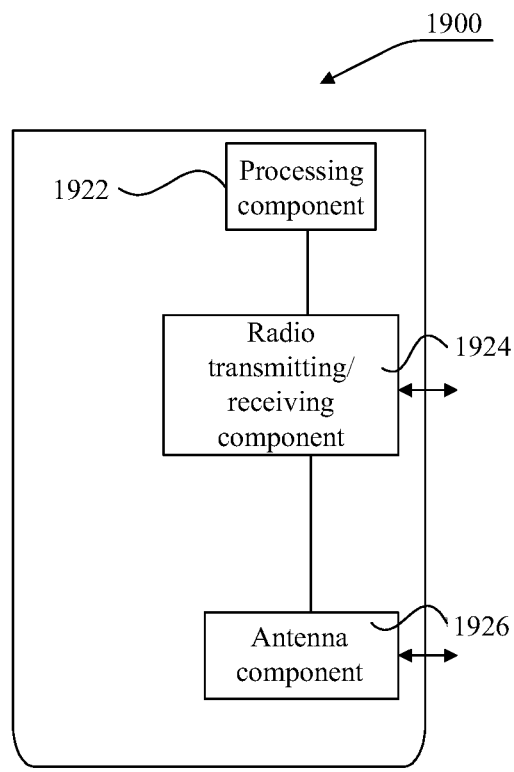
FIG. 23 is a schematic structural diagram of a data transmission apparatus shown according to an example of the disclosure.

As shown in FIG. 23, FIG. 23 is a schematic structural diagram of a data transmission apparatus shown according to an example. An apparatus 1900 may be provided as a core network device. The core network device may be a 4G core network device or a 5G core network device. Referring to FIG. 23, the apparatus 1900 includes a processing component 1922, a radio transmitting/receiving component 1924, an antenna component 1926 and a signal processing part specific to a radio interface. The processing component 1922 may further include one or more processors.

One of the processors in the processing component 1922 may be configured to execute any one of the above data transmission methods applied for a core network side.

Correspondingly, the disclosure further provides a data transmission apparatus. The apparatus is applied for a base station accessed by a second SIM (Subscriber Identification Module) card on a terminal which supports a plurality of SIM cards, including:

a processor; and a memory for storing processor executable instructions.

The processor is configured to:

receive target data and first indication information sent by a core network, where the first indication information is used to inform the base station that the target data is data that is required to be sent to a first SIM card; and send the target data to the first SIM card after establishing an RRC (Radio Resource Control) connection with the first SIM card based on the first indication information.

Correspondingly, the disclosure further provides a data transmission apparatus. The apparatus is applied for a base station accessed by a second SIM (Subscriber Identification Module) card on a terminal which supports a plurality of SIM cards, including:

a processor; and a memory for storing processor executable instructions.

The processor is configured to:

receive target data, first indication information and second indication information sent by a core network, where the first indication information is used to inform the base station that the target data is data that is required to be sent to the first SIM card, and the second indication information is used to inform the base station that the first SIM card and the second SIM card belong to the same terminal;

send the target data to the first SIM card after establishing an RRC (Radio Resource Control) connection with the first SIM card based on the first indication information; or send the target data to the second SIM card based on the first indication information and the second indication information.

Correspondingly, the disclosure further provides a data transmission apparatus. The apparatus is applied for a base station accessed by a second SIM (Subscriber Identification Module) card on a terminal which supports a plurality of SIM cards, including:

a processor; and a memory for storing processor executable instructions.

The processor is configured to:

receive third indication information sent by a core network, where the third indication information is used to inform the base station that the core network has target data that is required to be sent to a first SIM card of the terminal;

send a data request message for requesting the target data to the core network based on the third indication information;

receive the target data sent by the core network based on the data request message; and send the target data to the first SIM card after establishing an RRC (Radio Resource Control) connection with the first SIM card.

Correspondingly, the disclosure further provides a data transmission apparatus. The apparatus is applied for a base station accessed by a second SIM (Subscriber Identification Module) card on a terminal which supports a plurality of SIM cards, including:

a processor; and a memory for storing processor executable instructions.

The processor is configured to:

receive second indication information and third indication information sent by a core network, where the second indication information is used to inform the base station that the first SIM card and the second SIM card belong to the same terminal, and the third indication information is used to inform the base station that the core network has target data that is required to be sent to the first SIM card of the terminal;

send a data request message for requesting the target data to the core network based on the third indication information;

receive the target data sent by the core network based on the data request message;

send the target data to the first SIM card after establishing an RRC (Radio Resource Control) connection with the first SIM card; or send the target data to the second SIM card based on the second indication information and the third indication information.

Figure 24:
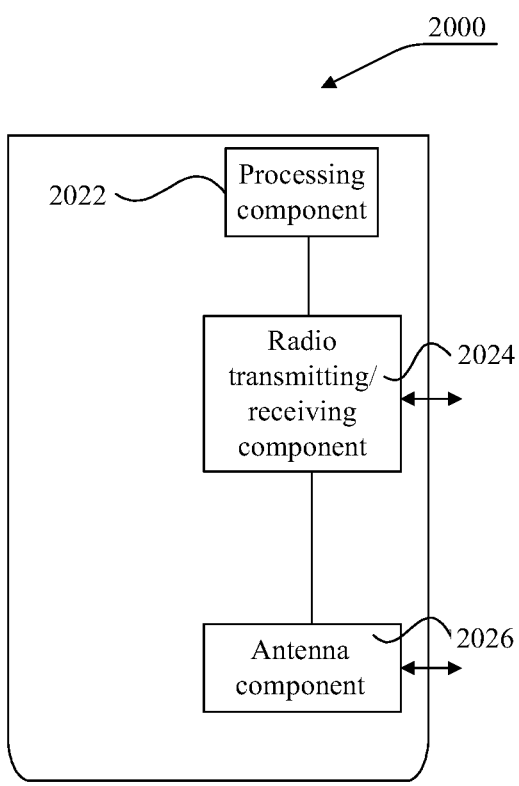
FIG. 24 is a schematic structural diagram of another data transmission apparatus shown according to an example of the disclosure.

As shown in FIG. 24, FIG. 24 is a schematic structural diagram of a data transmission apparatus shown according to an example. An apparatus 2000 may be provided as a base station. Referring to FIG. 24, the apparatus 2000 includes a processing component 2022, a radio transmitting/receiving component 2024, an antenna component 2026 and a signal processing part specific to a radio interface. The processing component 2022 may further include one or more processors.

One of the processors in the processing component 2022 may be configured to execute any of the data transmission methods applied for a base station accessed by a second SIM (Subscriber Identification Module) card on a terminal which supports a plurality of SIM cards.

Those skilled in the art will easily think of other implementations of the disclosure after considering the specification and practicing the invention disclosed herein. The disclosure is intended to cover any variations, uses or adaptations of the disclosure. These variations, uses or adaptations follow the general principles of the disclosure and include common knowledge or conventional technical means in the technical field that is not disclosed in the disclosure. The specification and the examples are only to be regarded as illustrative, and the true scope and spirit of the disclosure are pointed out by the following claims.

It should be understood that the disclosure is not limited to the precise structure that has been described above and shown in the accompanying drawings, and various modifications and changes can be made without departing from its scope. The scope of the disclosure is only limited by the appended claims.

What is claimed is:

1. A data transmission method, wherein the method is carried out in a core network, comprising:
   determining, when target data is required to be sent to a first SIM (Subscriber Identification Module) card on a terminal which supports a plurality of SIM cards, whether there is a second SIM card on the terminal; and
   sending, when there is the second SIM card, target indication information to a base station accessed by the second SIM card, wherein the target indication information is configured to indicate to the base station accessed by the second SIM card to send the target data to the first SIM card after establishing an RRC (Radio Resource Control) connection with the first SIM card.

2. The data transmission method according to claim 1, wherein the target indication information comprises first indication information, and the first indication information is used to inform the base station that the target data is data that is required to be sent to the first SIM card; and
   the data transmission method further comprises:
   sending the target data to the base station while sending the target indication information to the base station.

3. The data transmission method according to claim 2, wherein the target indication information further comprises second indication information, and the second indication information is used to inform the base station that the first SIM card and the second SIM card belong to the same terminal.

4. The data transmission method according to claim 1, wherein the target indication information comprises third indication information, and the third indication information is used to inform the base station that the core network has the target data that is required to be sent to the first SIM card; and
   the method further comprises:
   receiving a data request message for requesting the target data returned by the base station based on the third indication information; and
   sending the target data to the base station based on the data request message.

5. The data transmission method according to claim 4, wherein the target indication information further comprises second indication information, and the second indication information is used to inform the base station that the first SIM card and the second SIM card belong to the same terminal.

6. The data transmission method according to claim 1, wherein the first SIM card is a SIM card on the terminal in an IDLE state, and the second SIM card is a SIM card that belongs to a same operator as the first SIM card and is in a connected state on the terminal.

7. A non-transitory computer-readable storage medium, storing a computer program, wherein the computer program configures a processor to carry out the data transmission method according to claim 1.

8. A data transmission apparatus, wherein the data transmission apparatus is integrated in the core network, comprising:
   a processor; and
   a memory for storing instructions;
   wherein the processor is configured to execute the instructions to carry out the data transmission method according to claim 1.

9. A data transmission method, wherein the method carried out by a base station accessed by a second SIM (Subscriber Identification Module) card on a terminal which supports a plurality of SIM cards, comprising:
   receiving target data and target indication information sent by a core network, wherein the target indication information comprises a first indication information, or comprises a first indication information and a second indication information, the first indication information is used to inform the base station that the target data is data that is required to be sent to a first SIM card, and the second indication information is used to inform the base station that the first SIM card and the second SIM card belong to the same terminal; and
   sending the target data to the first SIM card after establishing an RRC (Radio Resource Control) connection with the first SIM card based on the first indication information.

10. The data transmission method according to claim 9, wherein the first SIM card is a SIM card in an IDLE state on the terminal, and the second SIM card is a SIM card that belongs to a same operator as the first SIM card and is in a connected state on the terminal.

11. A non-transitory computer-readable storage medium, storing a computer program, wherein the computer program configures a processor to carry out the data transmission method according to claim 9.

12. A data transmission apparatus, wherein the data transmission apparatus is integrated in the base station accessed by the second SIM (Subscriber Identification Module) card on the terminal which supports the plurality of SIM cards, comprising:
- a processor; and
- a memory for storing processor executable instructions;
- wherein the processor is configured to execute the instructions to carry out the data transmission method according to claim 9.

13. A data transmission method, wherein the method is carried out by a base station accessed by a second SIM (Subscriber Identification Module) card on a terminal which supports a plurality of SIM cards, comprising:
- receiving target indication information sent by a core network, wherein the target indication information comprises a third indication information, or comprises a second indication information and the third indication information, the second indication information is used to inform the base station that a first SIM card and the second SIM card belong to the same terminal, and the third indication information is used to inform the base station that the core network has target data that is required to be sent to the first SIM card of the terminal;
- sending a data request message for requesting the target data to the core network based on the third indication information;
- receiving the target data sent by the core network based on the data request message; and
- sending the target data to the first SIM card after establishing an RRC (Radio Resource Control) connection with the first SIM card; or
- sending the target data to the second SIM card based on the second indication information and the third indication information.

14. The data transmission method according to claim 13, wherein the first SIM card is a SIM card in an IDLE state on the terminal, and the second SIM card is a SIM card that belongs to a same operator as the first SIM card and is in a connected state on the terminal.

15. A data transmission apparatus, wherein the data transmission apparatus is integrated in the base station accessed by the second SIM (Subscriber Identification Module) card on the terminal which supports the plurality of SIM cards, comprising:
- a processor; and
- a memory for storing processor executable instructions;
- wherein the processor is configured to execute the instructions to carry out the data transmission method according to claim 13.

16. A non-transitory computer-readable storage medium, storing a computer program, wherein the computer program configures a processor to carry out the data transmission method according to claim 13.

* * * * *